United States Patent
Michalski et al.

(10) Patent No.: US 7,919,547 B2
(45) Date of Patent: Apr. 5, 2011

(54) NANOFILLER-CONTAINING EPOXY RESINS AND STABLE AQUEOUS DISPERSIONS THEREOF

(75) Inventors: Eva-Maria Michalski, Sinzheim (DE); Manuela Ehreiser, Baden-Baden (DE)

(73) Assignee: Dow Global Technologies LLC

( * ) Notice: Subject to any disclaimer, the term of this patent is extended or adjusted under 35 U.S.C. 154(b) by 0 days.

(21) Appl. No.: 12/601,536

(22) PCT Filed: Jun. 4, 2008

(86) PCT No.: PCT/US2008/065749
§ 371 (c)(1), (2), (4) Date: Nov. 24, 2009

(87) PCT Pub. No.: WO2009/002671
PCT Pub. Date: Dec. 31, 2008

(65) Prior Publication Data
US 2010/0174016 A1 Jul. 8, 2010

Related U.S. Application Data

(60) Provisional application No. 60/936,969, filed on Jun. 22, 2007.

(51) Int. Cl.
*C08L 63/02* (2006.01)
*C08K 3/36* (2006.01)
*C08K 3/24* (2006.01)
*C08K 3/04* (2006.01)

(52) U.S. Cl. ........ 523/443; 524/445; 524/446; 524/492; 524/493; 524/495; 524/496

(58) Field of Classification Search .................. 524/445, 524/446, 492, 493, 495, 496; 523/443
See application file for complete search history.

(56) References Cited

U.S. PATENT DOCUMENTS

| | | |
|---|---|---|
| 3,503,917 A | 3/1970 | Burke |
| 4,018,426 A | 4/1977 | Mertz et al. |
| 4,123,403 A | 10/1978 | Warner et al. |
| 5,037,864 A | 8/1991 | Anand |
| 5,118,729 A | 6/1992 | Piechocki |
| 5,250,576 A | 10/1993 | DesMarais et al. |
| 5,344,856 A | 9/1994 | Klein |
| 5,424,340 A | 6/1995 | Pfeil et al. |
| 5,539,021 A | 7/1996 | Pate et al. |
| 5,602,193 A | 2/1997 | Stark |
| 6,271,287 B1 | 8/2001 | Piechocki et al. |
| 2004/0147029 A1 | 7/2004 | Adam |

FOREIGN PATENT DOCUMENTS

| | | |
|---|---|---|
| EP | 1366112 | 2/2002 |
| JP | 03-157445 | 7/1991 |
| WO | 02083776 | 10/2002 |

OTHER PUBLICATIONS

Ruckenstein, et al., Phase Behavior and Stability of Concentrated Emulsions, Journal of Colloid and Interface Science, vol. 133, No. 2, Dec. 1989, pp. 432-441.

Zhang, et al., Toughness Measurement of Thin Films: A Critical Review, Surface & Coatings Technology, vol. 198, 2005, pp. 74-84.

*Primary Examiner* — Peter Szekely

(57) ABSTRACT

A water-dispersible composition including a nanofiller-containing epoxy resin and a low temperature nonionic surfactant having a molecular weight of less than about 7,000 Daltons; and optionally an anionic surfactant or optionally a high temperature nonionic surfactant. The water-dispersible composition can be used to prepare an aqueous dispersion of the nanofiller-containing epoxy resin. The aqueous dispersion advantageously has a long shelf-stability. One method for preparing the aqueous dispersion includes using a high internal phase ratio emulsion process.

16 Claims, No Drawings

NANOFILLER-CONTAINING EPOXY RESINS AND STABLE AQUEOUS DISPERSIONS THEREOF

CROSS REFERENCE TO RELATED APPLICATIONS

This is a §371 application of PCT International Patent Application Number PCT/US2008/065749 filed Jun. 4, 2008, and claims priority from provisional application Ser. No. 60/936,969 filed Jun. 22, 2007, each of which is incorporated herein by reference in its entirety.

FIELD OF INVENTION

The present invention relates to stable compositions of epoxy resins containing nanofillers; and to stable waterborne epoxy dispersions containing nanofillers. The stable aqueous dispersions of nanofiller-containing epoxy resins are useful, for example in coatings, flooring, mortars and glass fiber sizing, and other applications where higher abrasion resistance or mechanical performance is required like in composites or laminates; and where solvent-free solutions are needed.

BACKGROUND OF THE INVENTION

Waterborne dispersions of epoxy resins are disclosed, for example, in U.S. Pat. Nos. 5,118,729; 5,344,856; 5,424,340; 5,602,193; and 6,271,287; and Japanese Patent Application Kokai: Hei 3-157445, which disclosures are incorporated herein by reference.

One of the problems with state-of-the-art waterborne epoxy dispersions is that the shelf-stability of the dispersions is not sufficiently long enough for practical use, (i.e., the dispersions should have a shelf-life of greater than six months for practical use). The problem of shelf-stability is exacerbated when epoxy resins containing nanofillers are used. The shelf-life of epoxy resins containing nanofillers is less than six months, and the coatings produced from such dispersions have defects. It would therefore be an advantage in the art to discover a waterborne, nanofiller-containing epoxy resin which has a long (greater than 6 months) shelf-stability.

None of the above-mentioned prior art patents make reference to a waterborne epoxy dispersion containing nanofillers. Instead, the prior art patents describe solutions for the stability problem for epoxy resins which do not contain nanofillers. For example, U.S. Pat. No. 6,271,287 describes the selection of certain nonionic surfactants to produce stable epoxy dispersions. However, U.S. Pat. No. 6,271,287 does not describe: (i) the use surfactants in combination with epoxy resins containing nanofillers, (ii) the stability issues faced with the use of epoxy resins containing nanofillers, or (iii) the problems faced with the use of nanofiller-containing epoxy resins or dispersions in combination with water-soluble hardeners or emulsion curing agents for making waterborne coatings.

One route to prepare waterborne coatings is to use a liquid epoxy resin in combination with an emulsion of a curing agent, which is capable of emulsifying the liquid epoxy resin. If the liquid epoxy resin contains nanofillers like nanosilica, the coating made from such two-component epoxy system shows major defects such as the presence of particles or agglomerates in the coating. In addition, the known epoxy systems containing nanofillers have such a short potlife that consequently the resultant resins are impractical to use under standard conditions.

Some commercial epoxy resins containing nanofillers are currently available and such nanofiller-containing resins are used to improve properties to a coating made therefrom. For example, the abrasion resistance, toughness or other mechanical properties of the coating can be improved by using such commercial epoxy resins containing nanofillers. Also, the flame retardant properties of the resins containing nanofillers can be improved. However, when these known resins, which already contain nanofillers, are formulated with waterborne hardeners, like water-soluble epoxy amine adducts, the resulting coatings from such formulations either have a very short potlife, so that the coatings can not be applied to a substrate in a practical way or within a practical time period; or the resultant coatings show particles and agglomerates. These disadvantageous phenomena can not be observed with similar resins that do not contain any nanofillers.

Therefore, it is desirable to provide a dispersible resin and/or a dispersion of an epoxy resin containing a nanofiller which does not have the problems of the prior art. It is also desirable to produce dispersion resins which contain nanofillers; and to make the resins themselves usable in combination with conventional hardeners specifically developed to disperse liquid epoxy resins. It is further desired to provide waterborne coatings and glass fiber sizings made from such nanofiller-containing epoxy resin dispersions.

SUMMARY OF THE INVENTION

The present invention is directed to solving the problems of the prior art by selecting and adding certain surfactants, at a predetermined effective level, to an epoxy resin containing nanofillers; and to preparing a water-dispersible resin or a waterborne epoxy dispersion based on this surfactant technology. The present invention is also directed to epoxy resins, which contain nanofillers; and to a process for making such nanofiller-containing epoxy resins by dispersing such resins into water or modifying said resins in such a way that the resins become water-dispersible resins with a minimum shelf-life of about six months. The nanofiller-containing epoxy resins of the present invention can be used in combination with emulsion curing agents or water-soluble hardeners to produce defect-free films. The nanofiller-containing epoxy resins of the present invention may also be used as an ingredient in fiber sizing formulations.

Accordingly, one aspect of the present invention is a water-dispersible composition comprising a mixture of:
(a) a nanofiller-containing epoxy resin;
(b) at least one low temperature nonionic surfactant;
(c) optionally, at least one anionic surfactant; and
(d) optionally, a high temperature nonionic surfactant.

Another aspect of the present invention is a composition comprising a stable aqueous dispersion of a nanofiller-containing epoxy resin stabilized by a low temperature nonionic surfactant, and optionally, an anionic surfactant, or optionally, a high temperature nonionic surfactant; wherein the low temperature nonionic surfactant is characterized by having a molecular weight of not less than about 1,000 Daltons and not more than about 7,000 Daltons; and the total surfactant concentration of the dispersion is from about 5 weight percent to about 20 weight percent, based on the weight of the total surfactants and the epoxy resin.

Yet another aspect of the present invention is a process for making a water-dispersible composition comprising mixing:
(a) a nanofiller-containing epoxy resin;
(b) at least one low temperature nonionic surfactant;
(c) optionally, at least one anionic surfactant; and (d) optionally, a high temperature nonionic surfactant.

Another aspect of the present invention is a process for making a stable aqueous dispersion composition comprising mixing a nanofiller-containing epoxy resin with a low temperature nonionic surfactant; and optionally, an anionic surfactant or optionally, a high temperature nonionic surfactant; wherein the low temperature nonionic surfactant is characterized by having a molecular weight of not less than about 1,000 Daltons and not more than about 7,000 Daltons; and the total surfactant concentration of the dispersion is from about 5 weight percent to about 20 weight percent, based on the weight of the total surfactants and the epoxy resin.

Still another aspect of the present invention is a process of preparing a stable aqueous dispersion of a nanofiller-containing epoxy resin comprising the steps of:

(a) continuously merging into a disperser, and in the presence of an emulsifying and stabilizing amount of a surfactant mixture, a flowing stream of water flowing at a rate $r_1$, and a flowing stream containing a nanofiller-containing epoxy resin flowing at a rate $r_2$;

(b) mixing the streams with a sufficient amount of shear to form a high internal phase ratio emulsion; and (c) diluting the high internal phase ratio emulsion with water to form the stable aqueous dispersion;

wherein the surfactant includes a low temperature nonionic surfactant; and optionally, an anionic surfactant or optionally, a high temperature nonionic surfactant;

wherein the low temperature nonionic surfactant is characterized by having a molecular weight of not less than about 1,000 Daltons and not more than about 7,000 Daltons; and where $r_2:r_1$ is in such a range that the volume average particle size of the dispersion is not greater than 2 microns.

DETAILED DESCRIPTION OF THE PREFERRED EMBODIMENTS

"Dispersible resin" herein means that the resin is either modified or blended with interfacial active compounds like surfactants which allow the resin to be dispersed by stirring into another phase such as a solvent or water. If the phase is water and the dispersible resin is capable of being dispersed in water, the dispersible resin is referred to herein as a "water-dispersible resin".

"Dispersion composition" herein means a composition of an epoxy resin already containing nanofiller, a low temperature nonionic surfactant, potentially an anionic surfactant and potentially a high temperature nonionic surfactant and water as a solvent.

By "low temperature" nonionic surfactant it is meant a surfactant that is operational at a temperature of from about 20° C. to about 65° C.

By "high temperature" nonionic surfactant it is meant a surfactant that is operational at a temperature of from about 60° C. to about 95° C.

"Waterborne coating" herein means that an epoxy resin and a curing agent are mixed and applied on a substance; and either the resin or the curing agent or both can be waterborne dispersions of the components; and/or the curing agent can be a solution in water.

"Pot-life" herein means the time frame from the mixing of the epoxy resin or dispersion with the curing agent until the composition can not be used any further either because of high viscosity or because of a decrease in performance of the coating.

The terms "shelf-life", "shelf-stability" and "storage-stability" are used herein interchangeably to mean the time period a product can be used without changing the product's specific properties, for example, EEW, viscosity, and/or solid content to name a few.

"Stable" herein means, in the case of a dispersion, that the dispersion does not show agglomeration or strong sedimentation which can not be stirred into the dispersion by simple means like a stirrer.

"Nanofiller" herein means inorganic particles with an average particle size of less than 200 nanometer, such as for example silica.

"Nanofiller-containing epoxy resin" herein means an epoxy resin containing a pre-dispersed nanofiller.

"Water-soluble hardeners" herein means epoxy curing agents, for example, multifunctional and modified amines, which are dilutable with water.

"Volume average particle size" is expressed by the D[4.3] value which is the equivalent volume diameter or the De Broucker mean.

"Submicron particle size" herein means that the average particle size of the dispersion is less than 1 micron.

"Liquid epoxy resin (LER)" herein means a bifunctional bisphenol A based epoxy resin with an epoxy equivalent weight (EEW) of from about 170 to about 220.

"Defect-free" herein means, in the case of a coating, that the coating does not show any defects with respect to, for example, blistering, agglomerates or particles.

"Abrasion resistant herein means, in the case of a coating, that an improvement in abrasion of the coating can be seen by using abrasion measurement method ASTM D 968 or ASTM F 510-93.

The broadest scope of the present invention is the use of a surfactant package with a nanofiller-containing epoxy resin to provide a nanofiller-containing epoxy resin dispersion with a practical shelf-stability for use in various applications. The surfactant used in the present invention comprises a low temperature nonionic surfactant. Optionally, an anionic surfactant can be used as a second co-surfactant with the low temperature nonionic surfactant. Optionally, a high temperature nonionic surfactant can be used as a co-surfactant with the low temperature nonionic surfactant.

The nanofiller-containing epoxy resin employed in the present invention can be any epoxy resin known in the art that contains an effective amount of nanofiller. The nanofiller-containing epoxy resins used in the present invention can be commercially available nano-filler-containing epoxy resins such as Nanopox® C 450, Nanopox C450, Nanopox C 620, Nanopox A 410, Nanopox A 510, Nanopox A 650, Nanopox F 400, Nanopox F 440, and Nanopox F 520, commercially available from Nanoresins; and mixtures thereof.

Alternatively, the nanofiller-containing epoxy resin employed in the present invention can be prepared by mixing any well-known epoxy resin with an effective amount of a nanofiller. For example, the epoxy resins used in the present invention may be polyglycidyl ethers of a polyhydroxy hydrocarbon. Such epoxy resins may be produced by reacting an epihalohydrin with a polyhydroxy hydrocarbon or a halogenated polyhydroxy hydrocarbon. Such preparations are well known in the art. (See for example, U.S. Pat. No. 5,118, 729, column 4). A preferred epoxy resin used in the present invention is a diglycidyl ether of bisphenol A. Such epoxy resin is then mixed with a nanofiller to produce the nanofiller-containing epoxy resin. A process for preparing a nanofiller-containing epoxy resin is disclosed in U.S. Patent Application Publication No. US20040147029A1, WO 02083776, and EP 1366112, all of which are incorporated herein by reference.

Nanofillers used in the present invention include for example, silica, carbon black, clay nanofillers, hydrotalcite, fused silica, grapheme, and mixtures thereof. In another embodiment, the epoxy resin of the present invention can contain other fillers for providing the epoxy resin with certain properties. For example, carbon fibers can be used as the nanofiller to develop epoxy resin conductive systems.

The amount of nanofiller present in the epoxy resin is generally from about 20 weight percent (wt %) to about 60 wt %, preferably from about 40 wt % to about 60 wt %, and more preferably from about 40 wt % to about 50 wt %.

In one embodiment, epoxy resins useful in the present invention include for example liquid epoxy resins containing up to about 50 wt % of a nanofiller such as silica (for example, as aforementioned, a commercially available nanofiller-containing liquid epoxy resin is Nanopox C® 450 which is commercially available from Nanoresins). Other examples of epoxy resins useful in the present invention are other liquid epoxy resins which are modified with nanosilica or carbon fibers.

The amount of the nanofiller-containing epoxy resin used to produce the dispersible resin composition of the present invention is generally from about 40 wt % to about 90 wt %, preferably from about 50 wt % to about 90 wt %, and more preferably from about 70 wt % to about 90 wt %.

The low temperature nonionic surfactant useful in the present invention is characterized by having a molecular weight of generally not less than about 1,000 Daltons and not more than about 7,000 Daltons, and preferably not less than about 1200 Daltons and not more than about 5000 Daltons. Preferred low temperature nonionic surfactants are illustrated in the following structures:

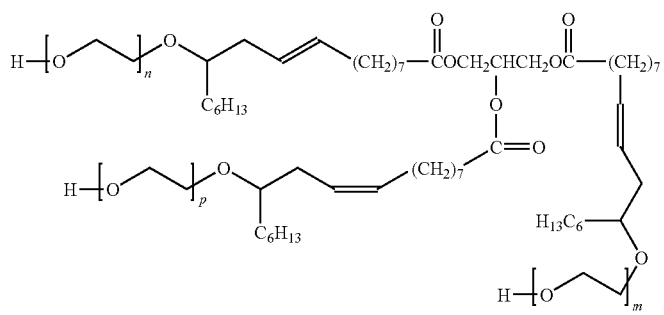

Formula I where the sum of n, m, and p in Formula I is such that the molecular weight of Formula I is not less than about 1,000 Daltons, and more preferably not less than about 2,000 Daltons; and not more than about 7,000 Daltons, and more preferably not more than about 5,000 Daltons. Commercially available Formula I low temperature nonionic surfactants include Hydropalat 3037 nonionic surfactant (available from Henkel, n+m+p=40), Emulgin PRT 100 nonionic surfactant (available from Henkel, n+m+p=100), and Emulpon EL 42 nonionic surfactant (available from Witco, n+m+p=42);

 Formula II where x is from about 10 to 18, and where y is from about 30 to about 50, more preferably from about 35 to about 45. A commercially available Formula II low temperature nonionic surfactant is Disponil TA 430 nonionic surfactant (available from Cognis, x=$C_{11}$-$C_{17}$, y=40);

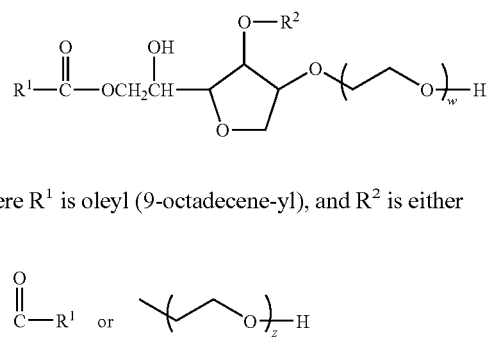

Formula III where $R^1$ is oleyl (9-octadecene-yl), and $R^2$ is either

where the sum of w and z is not less than about 10, and more preferably not less than about 15; and not greater than about 30, and more preferably not greater than about 25. A commercially available Formula III low temperature nonionic surfactant is Sorbanox AO nonionic surfactant (available from Witco), which is a mixture of the Formula III structures.

In one embodiment of the present invention, the low temperature nonionic surfactant employed in the present invention is an epoxy functional nonionic surfactant such as XZ 92576.00 produced by The Dow Chemical Company. Other preferred low temperature nonionic surfactants useful in the present invention include for example those having a molecular weight of less than 7,000 Daltons, such as Hydropalat 3037 (available from Cognis) or Disponil TA 430 (available from Cognis).

Other low temperature nonionic surfactants useful in the present invention are described in U.S. Pat. No. 5,118,729, incorporated herein by reference. For example polyethylene glycol (PEG) and monoalkyl ether of polyethylene glycol (MPEG), may be used.

To overcome the problems of the prior art, the present invention involves incorporating, uniformly and homogeneously into nanofiller-containing epoxy resins, a well defined level of a low temperature nonionic surfactant. If the level of surfactant is too low, the dispersions will show sedimentation within a day; and if the level of surfactant is too high the performance of the final coating will suffer. The dispersions of such nanofiller-containing epoxy resins show excellent properties like small volume average particle size, long shelf-life and provide clear coatings with no agglomeration in combination with commercial hardeners used for waterborne coatings. It is expected that the use of these dispersions on their own or in combination with other dispersions will bring improvements in the area of abrasion resistance, and toughness to name a few.

When the low temperature nonionic surfactant is used alone in a dispersible resin, the preferred concentration of surfactant is not less than about 10 wt %, more preferably not less than about 14 wt %, and most preferably not less than about 16 wt %; and preferably not greater than about 25 wt %, more preferably not greater than about 20 wt %, and most preferably not greater than about 18 wt %, based on the weight of the epoxy resin. The amount of the nonionic surfactant used in the dispersible resin composition of the present invention is generally from about 5 wt % to about 20 wt %, preferably from about 10 wt % to about 20 wt %, and more preferably from about 14 wt % to about 18 wt %.

An optional component which may be used in the present invention comprises an anionic surfactant. Since the quantity of total nonionic surfactant required to prepare epoxy dispersions of satisfactory stability tends to be higher in the absence of a suitable anionic co-surfactant, a small amount of an anionic co-surfactant may be added along with the nonionic surfactant to minimize the total surfactant used in the dispersion. The anionic surfactant is selected such that the combination of the nonionic surfactant and the anionic surfactant reduces the interfacial tension of the epoxy resin as compared to the interfacial tension of the resin in the absence of the anionic surfactant.

One method of determining the suitability of an anionic surfactant includes the step of: combining the anionic surfactant with a low temperature nonionic surfactant in an epoxy resin at the temperature at which the low temperature nonionic surfactant is effective (usually ambient temperature, about 25° C.), and measuring the interfacial tension of the resin in the presence of the anionic surfactant and the low temperature nonionic surfactant resin, as compared to the interfacial tension of the resin in the presence of only the low temperature nonionic surfactant.

One embodiment of the anionic surfactant useful in the present invention is one that shows, in combination with the low temperature nonionic surfactant, a decrease in interfacial tension of the epoxy resin as compared to the interfacial tension of the resin in the absence of the anionic surfactant. The most preferred anionic surfactant is one that shows a maximal decrease in interfacial tension of the epoxy resin for the low temperature nonionic surfactant.

Some examples of anionic surfactants useful in the present invention include sulfosuccinates, phospateesters and alkylethersulfates, and mixtures thereof.

When the anionic surfactant is used with the low temperature nonionic surfactant, the preferred concentration of the anionic surfactant is not less than about 0.5 wt %, more preferably not less than about 1 wt %, and most preferably not less than about 2 wt %; and preferably not greater than about 6 wt %, more preferably not greater than about 4 wt %, and most preferably not greater than about 3 wt %, based on the weight of the epoxy resin and the low temperature nonionic surfactant.

Another optional component which may be used in the present invention comprises a high temperature nonionic surfactant. The high temperature nonionic surfactant is characterized by having a molecular weight of greater than about 7,000 Daltons and not more than about 20,000 Daltons. Preferably, the high temperature nonionic surfactant has the following structure:

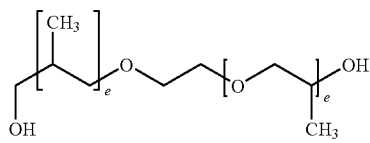

where each e is not less than about 10, preferably not less than about 15, most preferably not less than about 20; and not greater than about 50, more preferably not greater than 40, and most preferably not greater than 30; and f is not less than about 100, more preferably not less than about 200, and most preferably not less than about 250; and preferably not greater than about 500, more preferably not greater than about 400, and most preferably not greater than about 300. Examples of commercially available high temperature nonionic surfactants include Atsurf 108 surfactant (available from ICI) and Pluronic F108 surfactant (available from BASF Corp.), each with a molecular weight of about 14,000 (e=24; f=255).

Another example of a high temperature nonionic surfactant useful in the present invention is one which has the structure of the Formula I nonionic surfactant, wherein the sum of n, m, and p is such that the molecular weight is greater than about 7,000 Daltons and less than about 20,000 Daltons. An example of a commercially available high temperature nonionic surfactant is Emulgin PRT 200 nonionic surfactant (available from Henkel). Other examples of suitable high temperature nonionic surfactants included ethoxylated mono-or dialkyl phenols such as polyethylene glycol nonyl or dinonyl phenyl ethers. An example of a commercially available ethoxylated dialkyl phenyl ether is Igepal DM 970 FLK PEG-i150 dinonyl phenyl ether (available from Rhone-Poulenc).

When the high temperature nonionic surfactant is used with the low temperature nonionic surfactant and/or the anionic surfactant, the preferred concentration of the high temperature nonionic surfactant is not less than about 4 wt %, more preferably not less than about
6 wt %, and most preferably not less than about 7 wt %; and preferably not greater than about
18 wt %, more preferably not greater than about 15 wt %, and most preferably not greater than about 13 wt %, based on the weight of the epoxy resin, the low temperature nonionic surfactant and the anionic surfactant.

For preparing the dispersible resins of the present invention, an epoxy resin component and a nonionic surfactant component including optional component, if any, are necessarily mixed together as described above. When a waterborne dispersion composition of the present invention is prepared, an additional component used in the present invention comprises water; water is used if a dispersion will be produced. The amount of the water used in the dispersion resin composition of the present invention is generally from about 25 wt % to about
60 wt %, preferably from about 40 wt % to about 60 wt % and more preferably from about 40 wt % to about 50 wt %.

In one illustration of the present invention, the use of low temperature nonionic surfactants having a molecular weight of less than 7,000 Daltons at a weight level of greater than about 15 wt % is important for the preparation of the dispersion and for the shelf-life thereof. The level of the surfactant is important to get a dispersion with particles in the submicron range, which is important for the production of storage-stable dispersions. This approach works also by blending liquid epoxy resins having a molecular weight of from about 300 Daltons to about 400 Daltons with the same surfactant type and level which results in a water-dispersible resin. These dispersions or water-dispersible resins are expected to bring improvements in the area of abrasion resistance, but also for improving mechanical performance of coatings or fiber sizings. The dispersion of water-dispersible resins may be used as the resin/dispersion in the formulation, or may be used as an additive in other formulations.

The process of the present invention is essential to achieving the desired particle size and ensuring that the dispersions of the present invention are storage-stable with a shelf-life of about 6 months or more. Any method can be used to produce the dispersions of the present invention including batch, semi-batch, continuous and semi-continuous processes. Preferably, a mechanical dispersion process is used to produce the dispersions of the present invention.

A stable aqueous dispersion of a nanofiller-containing epoxy resin of the present invention can be prepared by any suitable method including, for example, the methods described in U.S. Pat. Nos. 3,503,917; 4,123,403; 5,037,864; and 5,539,021; the preparation descriptions of which are incorporated herein by reference. In one embodiment, the stable aqueous dispersion of the epoxy resin is prepared by first preparing a concentrated latex or a high internal phase ratio (HIPR) emulsion, then diluting the concentrated latex or HIPR emulsion with water. Preparing the stable aqueous dispersion from an HIPR emulsion is preferred.

With reference to a "high internal phase ratio emulsion (HIPR)", in conventional emulsions, the dispersed phase contains spheres having a volume fraction of less than 0.74, which is the volume fraction of the most compact arrangement of spheres of equal radius. However, for HIPR emulsions, the dispersed phase may have a dispersed phase volume fraction as high as 0.99. The continuous phase in such cases forms a thin liquid film that separate polyhedral cells, and the HIPR emulsion is stabilized by the adsorption of surfactant from the continuous phase on the surface of the cells. These HIPR emulsions are known to be useful as precursors to high molecular weight polymers, composites, and membranes for separation systems. (See Ruckenstein, et al., Phase Behavior and Stability of Concentrated Emulsions, Journal of Colloid and Interface Science, Vol. 133, No. 2, December 1989, pp. 432-441, incorporated herein by reference.)

The HIPR emulsion of the epoxy resin may also be prepared by any suitable method, such as the methods described in U.S. Pat. Nos. 4,018,426; 5,250,576; and 5,539,021; the preparation teachings of which are incorporated herein by reference.

Preferably, the HIPR emulsion is prepared by continuously merging into a disperser, a stream of water flowing at a rate $r_1$, and a stream containing the nanofiller -containing epoxy resin, the low temperature nonionic surfactant, and optionally the anionic surfactant, flowing at a rate $r_2$, then mixing the streams with a sufficient amount of shear to form the HIPR emulsion. The ratio of the flow rates $r_2:r_1$ is preferably in such a range that the polydispersity of the HIPR emulsion, defined as the ratio (Dv/Dn) of the volume average particle size (Dv) to the number average particle size (Dn), is not greater than about 2, more preferably not greater than about 1.5, and most preferably not greater than about 1.3; or the volume average particle size, as measured using a Coulter LS230 particle size analyzer (Coulter Instruments) or a Mastersizer 2000 (Malvern Instruments LTD), is not greater than about 2 microns, more preferably not greater than about 1 micron, and most preferably not greater than about 0.5 micron. Preferably, $r_2:r_1$ is in the range of from about 10:1 to about 2.5:1, more preferably in the range of from about 8.3:1 to about 2.85:1 and more preferable in the range of from about 7.7:1 to about 3.1:1.

It has surprisingly been discovered that aqueous dispersions of nanofiller-containing epoxy resins with long shelf stability and an unusually low concentration of surface active agents can be prepared simply with a proper selection of a low temperature nonionic surfactant. The waterborne, nanofiller-containing epoxy resin can be blended with other materials such as additives like defoamers or co-solvents.

The aqueous dispersions of nanofiller-containing epoxy resins of the present invention are useful in a number of applications including for example, fiber sizing including glass fiber, carbon fiber, and aramid fibers; protection and repair of concrete including floorings, mortars, grouts and adhesives; and protection and repair of steel against corrosion and chemical resistance like marine and protective coatings. Preferably, the aqueous dispersions of nanofiller-containing epoxy resins of the present invention are used in glass fiber sizing. In the glass fiber sizing application the nanofiller-containing resin or dispersion makes an excellent "bridge" between the glass fiber with the silica and the final epoxy matrix of the composite via the epoxy part and the silica.

Coatings and floorings with improved scratch resistance and toughness may also be prepared with the aqueous dispersions of nanofiller-containing epoxy resins of the present invention. "Toughness" herein means the toughness measurements obtained by tests done in accordance with ASTME-399. A summary of toughness measurement technologies can be found in Surface & Coatings Technology, 198 (2005), 74-84.

In order to provide a better understanding of the present invention including representative advantages thereof, the following examples are offered. The following examples illustrate the present invention, without limiting the present invention to the examples provided herein.

EXAMPLE 1

An 84 gram (g) sample of Nanopox C 450, a nanofiller-containing epoxy resin, was mixed with 16 g of XZ 92576.00, a low temperature nonionic surfactant, which is an epoxy modified polyethylene glycol and a proprietary material of The Dow Chemical Company. The mixture was blended in a metal beaker at 40° C. The resultant homogenous mixture was then mixed with a high speed stirrer at 2000 rpm and water was slowly added to the mixture at 40° C. until phase inversion occurred. The mixture was then stirred at 1000 rpm and water was added to the mixture until the desired solid content was achieved. Properties, such as EEW, solid content and volume average particle size, of the resultant stable dispersion were measured.

The particle size of the stable dispersion was measured with a Malvern Mastersizer 2000 and found to be: D[3.2]: 0.457 microns. The EEW of the epoxy resin was measured by a Methrom Titroprocessor, Type 682 and found to be EEW: 631. The solid content of the stable dispersion was found to be 60% as measured by a Sartorius Moisture Analyzer MA 45.

EXAMPLE 2

An 80.8 gram sample of Nanopox C 450, a nanofiller-containing epoxy resin, was mixed with 16.8 g of Hydropalat 3037, a low temperature nonionic surfactant, and 2.5 g of a anionic surfactant based on sodium dioctyl sulfosuccinate (Disponil SUS IC 875, available from Cognis); and blended in a metal beaker at 40° C. The homogenous mixture was then mixed with a high speed stirrer at 2000 rpm and water was slowly added to the mixture at 40° C. until phase inversion occurred. The mixture was then stirred at 1000 rpm and water was added to the mixture until the desired solid content was achieved. Properties, such as EEW, solid content and volume average particle size, of the resultant stable dispersion were measured.

The EEW of the epoxy resin was measured by a Methrom Titroprocessor and found to be EEW: 746. The solid content of the stable dispersion was found to be 54% as measured by a Sartorius Moisture Analyzer MA 45.

COMPARATIVE EXAMPLE A

An 80.8 gram sample of Nanopox C 450, a nanofiller-containing epoxy resin, was mixed with 16.8 g of Atsurf 108, a high temperature nonionic surfactant, and 2.5 g of a anionic surfactant based on sodium dioctyl sulfosuccinate (Disponil SUS IC 875, available from Cognis); and blended in a metal beaker at 40° C. The homogenous mixture was then mixed with a high speed stirrer at 2000 rpm and water was slowly added to the mixture at 40° C. until phase inversion occurred. The mixture was then stirred at 1000 rpm and water was added to the mixture until the desired solid content was achieved. Agglomeration of the resulting dispersion took place nearly immediately. Properties such as EEW, solid content and volume average particle size of the dispersion could not be measured as no dispersion could be produced.

COMPARATIVE EXAMPLE B

An 92 gram sample of Nanopox C 450, a nanofiller-containing epoxy resin, was mixed with 8 g of XZ 92576.00, a low temperature nonionic surfactant, which is an epoxy modified polyethylene glycol and a proprietary material of The Dow Chemical Company, and blended in a metal beaker at 40° C. The homogenous mixture was then mixed with a high speed stirrer at 2000 rpm and water was slowly added to the mixture at 40° C. until phase inversion occurred. The mixture was then stirred at 1000 rpm and water was added to the mixture until the desired solid content was achieved. Agglomeration of the resulting dispersion took place nearly immediately. Properties such as EEW, solid content and particle size of the dispersion could not be measured as no dispersion could be produced.

EXAMPLE 3

Preparation of Defect-Free Coatings: With Dispersible Resin

An 18 gram sample of Nanopox C 450, a nanofiller-containing epoxy resin, was mixed with 2 g of XZ 92576.00, a low temperature nonionic surfactant, which is an epoxy modified polyethylene glycol and a proprietary material of The Dow Chemical Company. This water-dispersible resin was then mixed with 18 grams of a hardener, Epilink® 701, and 10 grams of water. The mixture was then applied on a glass panel with a film applicator (120 microns wet) and cured at 23° C. and 50% humidity. The cured films were clear and showed no particles or agglomerates rated by visual assessment of the films on the glass substrate.

EXAMPLE 4

Preparation of Defect-Free Coatings: With Dispersion

A 67.32 gram sample of a dispersion containing Nanopox C 450 (solids 50%, EEW 618), a nanofiller-containing epoxy resin, was mixed with 32.68 grams of a hardener, Epilink® 701 (Air Products), and also applied on a glass panel with a film applicator (120 microns wet) and cured at 23° C. and 50% humidity. The cured films were clear and showed no particles or agglomerates as rated by visual assessment.

Samples prepared with a lower surfactant level or with a higher volume average particle size show immediately particles and agglomerates in cured films from such samples.

What is claimed is:

1. A water-dispersible composition comprising a mixture of:
   (a) a nanofiller-containing epoxy resin; and
   (b) at least one low temperature nonionic surfactant; wherein the concentration of the low temperature nonionic surfactant comprises from about 10 wt % to about 25 wt % based on the nanofiller-containing epoxy resin; and wherein the molecular weight of the low temperature nonionic surfactant comprises from about 1000 Daltons to about 7000 Daltons.

2. The composition of claim 1 including at least one anionic surfactant.

3. The composition of claim 1 including at least one high temperature nonionic surfactant.

4. The composition of claim 1 wherein the nanofiller-containing epoxy resin comprises (i) a bisphenol A or bisphenol F based epoxy resin with a maximum molecular weight of about 3000 Daltons, and (ii) a nanofiller selected from the group consisting essentially of silicon dioxide, graphene, clay or carbon black with a maximum volume average particle size of about 100 nm.

5. The composition of claim 2 wherein the anionic surfactant comprises a sulfosuccinate, a phophateester, an alkylethersulfate or mixtures thereof.

6. The composition of claim 2 wherein the concentration of the anionic surfactant comprises from about 1 wt % to about 6 wt %.

7. The composition of claim 3 wherein the high temperature nonionic surfactant comprises a polyoxyethylenepolyoxypropylene block copolymer with a molecular weight of about 15,000 Daltons.

8. The composition of claim 3 wherein the concentration of the high temperature nonionic surfactant comprises from about 6 wt % to about 18 wt %.

9. The composition of claim 1 wherein the nanofiller in the nanofiller-containing epoxy resin comprises a nanofiller selected from the group comprising spherical nanofillers, plate-shaped nanofillers, and needle-shaped nanofillers; and wherein the epoxy resin in the nanofiller-containing epoxy resin comprises a diglycidyl ether of bisphenol A or a diglycidyl ether of bisphenol F.

10. The composition of claim 1 wherein the volume average particle size of the nanofiller particles in the nanofiller-containing epoxy resin is less than about 0.2 microns.

11. A stable aqueous dispersion composition comprising
   (I) a water phase; and
   (II) a water-dispersible composition of claim 1.

12. A process for preparing a water-dispersible composition comprising mixing:
   (a) a nanofiller-containing epoxy resin; and
   (b) at least one low temperature nonionic surfactant; wherein the concentration of the low temperature nonionic surfactant comprises from about 10 wt % to about 25 wt % based on the epoxy resin containing the nanofiller; and wherein the molecular weight of the low temperature nonionic surfactant comprises from about 1000 Daltons to about 7000 Daltons.

13. A process for preparing a stable aqueous dispersion composition comprising mixing:
(I) a water phase; and
(II) a water-dispersible composition of claim 1.

14. The process of any one of claim 12, including at least one anionic surfactant.

15. The process of any one of claims 13, including at least one high temperature nonionic surfactant.

16. A process of preparing a stable aqueous dispersion of a nanofiller-containing epoxy resin comprising the steps of:
(a) continuously merging into a disperser, and in the presence of an emulsifying and stabilizing amount of a surfactant mixture, a flowing stream of water flowing at a rate $r_1$, and a flowing stream comprising a nanofiller-containing epoxy resin flowing at a rate $r_2$;
(b) mixing the streams of step (a) with a sufficient amount of shear to form a high internal phase ratio emulsion; and
(c) diluting the high internal phase ratio emulsion with water to form a stable aqueous dispersion; wherein the surfactant includes a low temperature nonionic surfactant and optionally an anionic surfactant or optionally a high temperature nonionic surfactant; wherein the low temperature nonionic surfactant is characterized by having a molecular weight of not less than about 1,000 Daltons and not more than about 7,000 Daltons; and where r2:r1 is in such a range such that the volume average particle size of the dispersion is not greater than about 2 microns.

* * * * *